Feb. 19, 1957  J. G. RUSSELL  2,781,772
LEVEL CONTROL VALVES FOR TANKS
Filed May 6, 1952   2 Sheets-Sheet 1
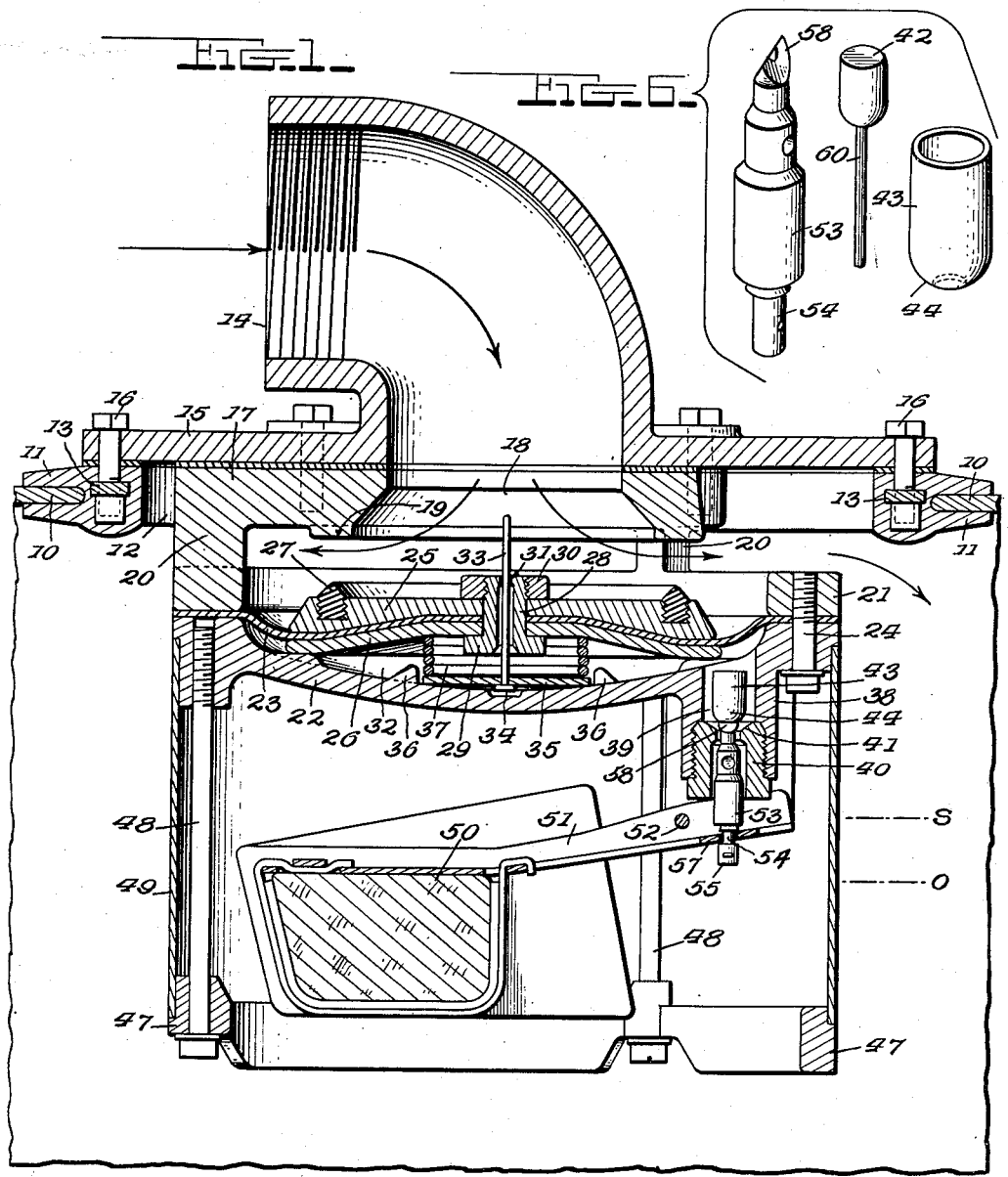
INVENTOR.
John G. Russell
BY
Mason, Porter, Diller & Stewart
attys.

Feb. 19, 1957 J. G. RUSSELL 2,781,772
LEVEL CONTROL VALVES FOR TANKS
Filed May 6, 1952 2 Sheets-Sheet 2
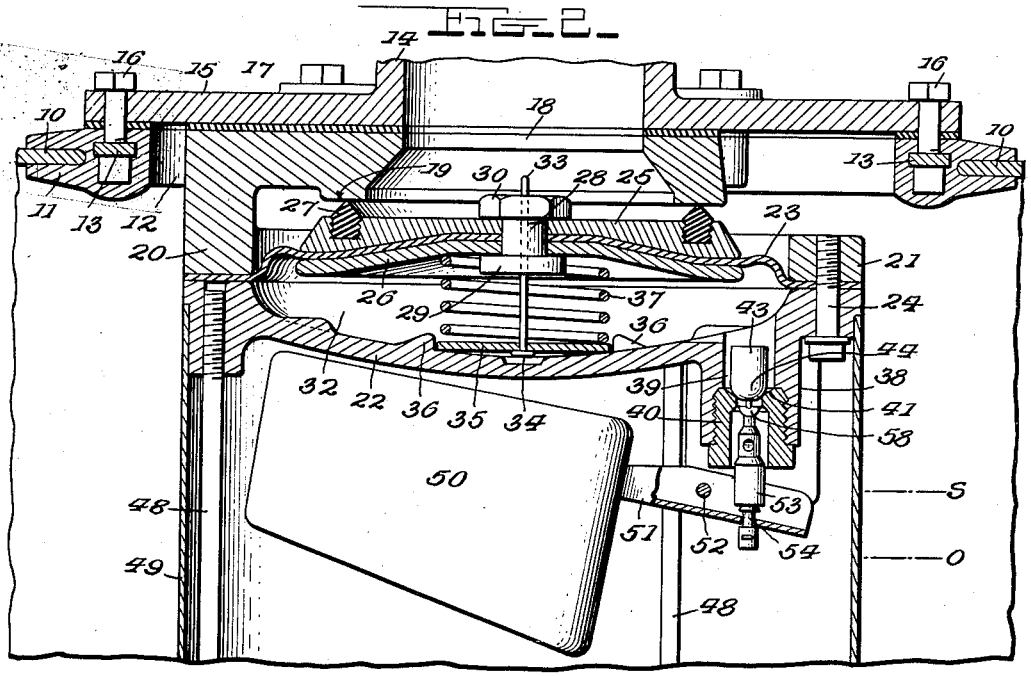
INVENTOR.
John G. Russell
BY
Mason, Porter, Diller & Stewart
attys.

2,781,772

LEVEL CONTROL VALVES FOR TANKS

John G. Russell, Cleveland, Ohio

Application May 6, 1952, Serial No. 286,285

5 Claims. (Cl. 137—411)

The invention relates to new and useful improvements in a fluid pressure operated valve and its associated float operated pilot valve for controlling the fuel level in a tank.

The present invention has been particularly developed for use in air craft fuel systems in connection with the filling of tanks directly from a ground supply source, or in connection with the transfer of fuel from one tank to another, the valve serving to shut off incoming fluid when the fluid within the tank reaches a predetermined level. In such installations it is desirable to use a relatively large inlet opening to each tank and to supply the fluid under a pressure which may be between 50 and 75 p. s. i. in order to fill the tank rapidly. At the same time it is desirable that the level to which the tank is filled shall be accurately held. Since the fluid enters the tank at a high rate of flow it is necessary to have the main valve close rapidly and positively when the predetermined fluid level is reached because any delay or variation in the valve closing movement will allow a relatively large amount of fluid to enter the tank and bring about undesirable variations in the level at which the final shut-off is obtained.

In level control valves of the present type, closure of the pilot valve causes closure of the fluid pressure operated main valve, and opening of the pilot valve permits opening of the main valve by pressure of fluid in the inlet. Closure of the pilot valve is effected by the buoyancy of the float and opening is effected by the weight or gravity action of the float.

To close the pilot valve the buoyant force of the float must exceed the forces opposing the closing movement of the valve, and to open the pilot valve the gravity force of the float must exceed the forces opposing the opening movement. The speed of opening or closing of the pilot valve is dependent to a large degree upon the amount which the gravity and buoyant forces of the float exceed the respective opposing forces. The gravity and buoyant forces are directly related to the weight and size of the float and in order to keep the weight and size of the float to a minimum, as is particularly desirable in airplane installations, it follows that the forces opposing opening and closing of the pilot valve must likewise be kept to a minimum.

Accordingly, it is an object of the present invention to provide a float operated pilot valve mechanism for a fluid pressure operated tank level control valve in which the forces tending to resist opening or closing movement of the pilot valve are kept to a minimum whereby the size and weight of the float may also be kept to a minimum and yet permit rapid response to variations in the level of the liquid for opening or closing the tank inlet.

It is another object to provide a pilot valve for a fluid pressure operated level control valve of the type described in which fluid pressure is utilized for holding the pilot valve in closed position but in which only a minimum amount of fluid pressure need be overcome by the float to cause the pilot valve to open. This object is obtained through the use of a pilot valve which includes a primary valve and a secondary valve wherein the primary has the fluid pressure contact area that is smaller than that of the secondary and so controlled by the float that the primary valve will be opened first and thus reduce the fluid pressure on the secondary valve to facilitate the opening of the secondary valve by the float.

It is another object to provide a tank level control valve in which fluid pressure is utilized for holding the pilot valve closed but wherein variations in the pressure of the fluid will have a minimum effect on the sensitivity of the valve with respect to opening or closing the tank inlet in response to variations of the level of fluid in the tank.

A further object of the invention is to provide a pilot valve of the above type wherein the primary valve is opened by a float controlled rod which is rigidly connected to the primary valve and has a lost motion connection with the secondary valve.

A further object of the invention is to provide a pilot valve of the above type wherein the seat engaging portions of both the primary valve and the secondary valve are spherical and make line contact with their respective valve seats.

A still further object of the invention is to provide a pilot valve of the above type wherein the fluid outlet of the primary valve is through the secondary valve so that the primary valve can be opened without disturbing the closed position of the secondary valve.

Other objects and advantages of the invention will become apparent from the following detailed description in the drawings.

Figure 1 is a vertical sectional view through the valve mechanism showing the main valve and the pilot valve in open position;

Figure 2 is a similar view through a portion of the housing of the valve mechanism with the main valve and the pilot valve in closed position;

Figure 3 is an enlarged detail in vertical section showing the pilot valve with the primary valve and the secondary valve in closed position;

Figure 4 is a similar view showing the primary valve only in open position and the fluid escape through the outlet opening controlled by said primary valve;

Figure 5 is a view similar to Figure 4 but showing the secondary valve as well as the primary valve opened so that the fluid may escape through the outlets controlled by said valves; and Figure 6 is a disassembled perspective view of the primary valve, the secondary valve and the devices for opening said valves.

In the drawings there is shown a portion 10 of the top wall of a rubber type fuel tank such as are used in aircraft, and which has vulcanized thereto an adapter 11 equipped with an opening 12 and having imbedded therein a metallic bolt ring 13.

The valve mechanism of the present invention is mounted in the opening 12 and includes an inlet fitting 14 having a flange 15 secured by suitable bolts 16 to the adapter 11. The fitting 14 is threaded to receive a fluid supply conduit. The flange and fitting close the opening 12.

Secured to the underside of the flange 15 is a plate 17. This plate has an inlet opening 18 in alignment with the opening through the fitting 14. Surrounding the inlet opening 18 is a valve seat 19. The plate 17 has at intervals depending lugs 20 which support a ring shaped member 21. This ring shaped member is spaced away from the plate 12 and provides openings leading to the tank. When the inlet 18 is opened fluid will flow through said inlet and the openings into the tank. The flow of fluid is indicated by the arrows in Figure 1. Directly beneath the ring-shaped member 21 is a cap plate 22. A flexible diaphragm 23 extends from one side of the ring shaped member to the other and is clamped thereto by the cap plate 22. Bolts 24 secure the cap plate 22 to the ring shaped member 21.

Mounted on the diaphragm 23 is the main valve which includes an inner section 25 and an outer section 26. The diaphragm extends between the sections. The valve is provided with a gasket 27 which is adapted to engage the valve seat 19 for closing the inlet opening. The two sections of the valve are held clamped against the diaphragm by a sleeve 28 having a flange 29 which engages the underface of the section 26 of the valve and a nut 30 which engages the upper face of the upper section 25. This sleeve 28 has an opening therethrough which at the upper end of the sleeve provides what is usually referred to as a restricted opening 31 through which fluid may pass through the valve to the chambers 32 between the diaphragm and the cap plate 22. Extending through the restricted opening 31 is a rod 33. This rod does not fill the restricted opening. At the lower end of the rod is a head 34 which extends beneath the plate 35. The plate is held from lateral movement by lugs 36 stuck up from the cap plate. The purpose of this rod 33 is to keep the restricted opening free from any obstructions. The rod is stationary and the valve and sleeve with the restricted opening move up and down on the rod. This clears away any foreign matter tending to clog the restricted opening. A spring 37 bears against the plate 35 and against the valve and tends to move the valve into closed position against the seat.

The cap plate 22 is provided with a depending boss 38 which is bored to provide an outlet channel 39 for fluid accumulating in the chamber 32. The boss 38 is further bored and threaded to receive an adapter 40 having a central bore therethrough surrounded by a cone-shaped valve seat 41. Associated with the valve seat is a pilot valve which includes a secondary valve 43 and a primary valve 42. The secondary valve has a spherical valve seat contacting surface 44. This spherical surface of the secondary valve makes line contact with the valve seat 41 when the pilot valves are closed. The secondary valve has an opening 45 therethrough and surrounding the opening is a cone-shaped valve seat 46. The valve contacting face of the primary valve is spherical and makes line contact with this tapered valve seat 46. Preferably, the spherical surfaces of the primary valve and the secondary valve are formed about a common center.

Spaced below the cap plate 22 is a ring shaped frame member 47. This frame member is supported by rods 48 threaded into lugs formed integral with the cap plate 22. Also extending from the cap plate 22 to the frame member 47 is a cylindrical housing member 49. Mounted in this housing which is open at the bottom is a float 50 of cork or other suitable material. The float is provided with an arm 51 which is pivoted at 52 to the cap plate 22. This float is of the usual construction and when engaged by the fluid in the tank will rise and fall with the level of the fluid. This float arm 51 is connected to the pilot valve and controls the opening and closing of the valve. The connection between the arm 51 and the pilot valve is in the form of a valve stem. Said stem includes a member 53 having a reduced portion 54 to which is attached a collar 55 by means of a cotter pin or the like. This collar 55 is spaced away from the lower end of the member 53 and said reduced portion extends through an opening 56 in the flange 57 formed on the arm 51. This connection permits the arm to oscillate about its pivotal support 52 and move the actuating stem in substantially a vertical line. At the upper end of the member 53 is a head 58 which is V-shaped in vertical cross section. This head 58 extends into the flow passage 59 which is located centrally of the valve seat 41 and guided by the wall of the flow passage. When the actuating stem is raised this head will move up into engagement with the primary valve 42 and raise the same from the valve seat 41 as shown in Figure 5. Located in a central bore in this actuating stem is a rod 60 which rod is fixedly connected to the primary valve 42. The actuating member has an opening centrally thereof and after the rod has been placed in said opening the portion 61 thereof is flattened and enlarged laterally by means of a punch so that the rod is fixedly secured to the actuating stem. The head 58 of the actuating stem is made V-shaped so that there is a fluid passage past the head at all times.

It is noted that this head 58 which contacts the secondary valve and opens the same is spaced away from said secondary valve when the valve is seated. This permits of a lost motion between the actuating stem and the secondary valve permitting the primary valve to be opened first, thus reducing the fluid pressure on the secondary valve so that it may be easily opened.

When the fluid in the tank drops to the predetermined level indicated by the broken line 0, the float, which has moved downward as the fluid level dropped, causes the actuating stem 53 to move upwardly to open the primary valve 42. If at this time there is fluid within the main valve and the inlet piping from either a ground filling operation or due to a connection to another tank from which fluid is being transferred, the primary valve 42 will be moved against the pressure of this fluid. Since the area against which the fluid exerts a seating pressure is relatively small, there will be a minimum amount of force required to open the valve 42 and as this force is provided by the weight of the float, such weight may likewise be relatively small.

When the primary valve 42 has opened it permits the fluid from the chamber 39 to pass through the central portion of the secondary valve 43 and pass the V-shaped portion 58 of the stem to the interior of the tank. The passage through the secondary valve 43 is larger than the restricted opening 28 and the fluid will be able to pass into the tank faster than it can replenish the supply in chamber 39 and therefore the pressure of the fluid in chamber 39 will be reduced. Further movement of the float in a downward direction will then raise the head 58 to engagement with the secondary valve 43 and lift the latter against the reduced pressure of fluid within the chamber 39 so that the fluid will not only continue to flow around the primary valve but also around the secondary valve and out through the flow channel 59. In this manner a lighter float can be utilized for opening the two part pressure seated pilot valve than would be necessary to open a pressure seated single pilot valve of comparable total flow capacity.

Moreover, since the area of the primary valve 42 which is subject to fluid pressure tending to keep the valve closed is of relatively small area, variations in the pressure of the fluid acting thereupon gives rise to only small changes in the total force required to open the primary valve and thus the weight of the float need not be such as to be able to accommodate large variations in the force required to open the pilot valve.

When the fluid in the tank has dropped to or below the point indicated by the broken line 0 the pilot valve, both the primary and secondary sections 42 and 43 are held open by the weight of the float as indicated above. If fluid under pressure is now introduced through the inlet fitting 14, either from a ground supply or from another tank from which fluid is being transferred, the main valve will automatically open to admit fluid to the tank. This is brought about by the fact that the passages through the pilot valve permit fluid to pass from the chamber 32 faster than it can enter through the restricted opening 28 from the inlet port with the result that there will be no build-up of fluid pressure within the chamber 32 tending to seat the main valve. Meanwhile, the pressure of the fluid in the inlet port 18 will unseat the main valve 25 and the fluid will pass into the tank for filling the same.

When the fluid in the tank reaches the level indicated by the broken line S the float will rise and its buoyant force will operate to close the pilot valve. Incoming fluid passing through the restricted opening 28 will then quickly build up pressure within the chamber 32, which with the assistance of the spring 37 will move the main valve to closed position and thus shut off the supply to the tank.

Both the primary and secondary valves 42 and 43 are in the flow path of the fluid passing from the chamber 32 to the interior of the tank when the pilot valve is open and the arrangement is such that the fluid flow tends to return both of the valves to closed position. During the filling of the tank such closing movement is opposed by the weight of the float plus the friction and inertia of the parts which move when the valves are actuated to closed position. Since the effective areas on the primary and secondary valves subject to the low pressure fluid passing through the pilot valve are relatively small, there is but a small total force exerted by the fluid pressure for moving the pilot valve to closed position and hence variations in this pressure has but little effect on the force required to hold the pilot valve in open position during filling.

After the pilot valve has closed and pressure has built up in chamber 32 to close the main valve, the pressure of the fluid within chamber 32 also serves to exert a seating force upon both the primary and secondary valves 42 and 43. This augments the force provided by the buoyancy of the float for holding the pilot valve closed and thus makes it possible to provide a smaller buoyant force, and hence a float of smaller volumetric size, than would otherwise be necessary.

It is noted that the secondary valve has a relatively long cylindrical body terminating in a spherical valve seat contacting head making line contact with its valve seat when closed. The spherical head also makes line contact with the V-shaped head when in open position. This constitutes the entire supporting means for the secondary valve and insures freedom from sticking and ease in opening and closing the same. Furthermore, if the secondary valve tilts in any direction still a tight seal is obtained when it is closed.

As illustrated the inlet leading to the tank is through the top wall of the tank. This same valve mechanism can be used in connection with an inlet through the bottom of the tank in which case the valve mechanism will be inverted but still arranged adjacent the top of the tank and the only change in the valve mechanism necessary is to shift the fulcrum 52 of the arm to the other side of the actuating stem so that the float in the inverted position of the valve mechanism will move toward the main valve for opening the pilot valve, which main valve is now at the underside of the valve mechanism instead of the upper side thereof.

It is obvious that many changes in the details of construction and the arrangement of this two step pilot valve may be made without departing from the invention set forth in the appended claims.

I claim:

1. In a fluid pressure operated valve mechanism for tanks having a fluid pressure chamber and a flow channel connecting said chamber with said tank, a pilot valve for controlling the flow of fluid through said channel comprising a primary valve and a secondary valve opening in the same direction, a float and means operated by said float including a lost motion connection between the float and the secondary valve for opening said primary and secondary valves in the sequence stated.

2. In a fluid pressure operated valve mechanism for tanks having a fluid pressure chamber and a flow channel connecting said chamber with said tank, a pilot valve for controlling the flow of fluid through said channel comprising a primary valve and a secondary valve opening in the same direction, said primary valve having a smaller fluid pressure area than the secondary valve, a float and means operated by said float including a lost motion connection between the float and the secondary valve for first opening the primary valve and after the fluid pressure has been reduced on the secondary valve then opening the secondary valve.

3. In a fluid pressure operated valve mechanism for tanks having a fluid presure chamber and a flow channel connecting said chamber with said tank, a pilot valve for controlling the flow of fluid through said channel comprising a primary valve and a secondary valve, said secondary valve having a fluid outlet centrally thereof when closed and said primary valve operating to close said outlet through the secondary valve, a float and means operated by said float including a lost motion connection between the float and the secondary valve for first opening the primary valve and then the secondary valve.

4. In a fluid pressure operated valve mechanism for tanks having a fluid pressure chamber and a flow channel connecting said chamber with said tank, a pilot valve for controlling the flow of fluid through said channel comprising a primary valve and a secondary valve said secondary valve having a fluid outlet centrally thereof when closed and said primary valve operating to close said outlet through the secondary valve, a float, an actuating stem operated by said float, said stem being rigidly connected to said primary valve and having a lost motion connection to said secondary valve whereby said primary valve will be opened first by the float and reduce the fluid pressure on the secondary valve to facilitate the opening of the same by the float.

5. In a fluid pressure operated valve mechanism for tanks having a fluid pressure chamber, a flow channel connecting the chamber with the tank, a pilot valve for controlling the flow of fluid through said channel comprising a cone-shaped valve seat in said flow channel, a secondary valve disposed in said flow channel and having a spherical head adapted to make line contact with said cone shaped valve seat, said secondary valve disposed in said flow channel and having an opening centrally thereof surrounded by a cone shaped valve seat, a primary valve having a spherical head adapted to make line contact with the cone shaped seat on the primary valve, a float, an actuating stem operated by said float, said stem having a V-shaped head adapted to engage said secondary valve and open the same and a rod extending through the opening in said secondary valve and rigidly connected to said primary valve, said V-shaped head being spaced away from the secondary valves when said pilot valves are closed whereby said actuating stem will open the primary valve first and then the secondary valve.

References Cited in the file of this patent

UNITED STATES PATENTS

| 1,100,601 | Miller | June 16, 1914 |
| 2,079,412 | Justus | May 4, 1937 |
| 2,491,521 | Samiran | Dec. 20, 1949 |

FOREIGN PATENTS

| 533,527 | Great Britain | 1941 |
| 867,422 | France | 1941 |